United States Patent
Yoshida et al.

(10) Patent No.: US 6,520,474 B2
(45) Date of Patent: Feb. 18, 2003

(54) VEHICLE SEAT SLIDE DEVICE

(75) Inventors: Tomonori Yoshida, Kanagawa-ken (JP); Ryo Fujimoto, Kanagawa-ken (JP); Moriyuki Eguchi, Kanagawa-ken (JP)

(73) Assignee: Ikeda Bussan Co., Ltd., Kanagawa-ken (JP)

(*) Notice: Subject to any disclaimer, the term of this patent is extended or adjusted under 35 U.S.C. 154(b) by 30 days.

(21) Appl. No.: 09/742,452

(22) Filed: Dec. 22, 2000

(65) Prior Publication Data

US 2001/0006209 A1 Jul. 5, 2001

(30) Foreign Application Priority Data

Dec. 27, 1999 (JP) ............................................ 11-371372
Dec. 28, 1999 (JP) ............................................ 11-374733

(51) Int. Cl.$^7$ .............................................. F16M 13/00
(52) U.S. Cl. ........................ 248/430; 248/424; 248/429
(58) Field of Search ................................ 248/424, 429, 248/430, 548

(56) References Cited

U.S. PATENT DOCUMENTS

| 4,533,107 A |   | 8/1985  | Okazaki et al. ............. 248/430 |
|-------------|---|---------|--------------------------------------|
| 4,720,073 A | * | 1/1988  | Mann et al. ................. 248/430 |
| 5,137,244 A | * | 8/1992  | Negi .......................... 248/430 |
| 5,192,045 A | * | 3/1993  | Yamada et al. ............. 248/430 |
| 5,213,300 A | * | 5/1993  | Rees .......................... 248/429 |
| 5,575,531 A | * | 11/1996 | Gauger et al. .......... 297/362.11 |
| 5,582,381 A | * | 12/1996 | Graf et al. ................... 248/430 |
| 5,746,409 A | * | 5/1998  | Rees .......................... 248/422 |
| 5,755,422 A | * | 5/1998  | Susko et al. ................. 248/430 |
| 5,882,074 A | * | 3/1999  | Kojima ........................ 297/341 |
| 5,961,089 A | * | 10/1999 | Soisnard ..................... 248/430 |
| 5,984,254 A | * | 11/1999 | Baloche et al. ............. 248/430 |
| 6,036,253 A | * | 3/2000  | Garrido .................... 296/65.13 |
| 6,089,521 A | * | 7/2000  | Tarusawa et al. ........... 248/430 |

FOREIGN PATENT DOCUMENTS

| EP | 0 796 759  | 9/1997 |
|----|------------|--------|
| JP | 09-095163  | 4/1997 |

* cited by examiner

*Primary Examiner*—Anita King
*Assistant Examiner*—Steven Marsh
(74) *Attorney, Agent, or Firm*—Gary M. Nath; Harold L. Novick; Marvin C. Berkowitz

(57) ABSTRACT

A vehicle seat slide device includes an elongated lower guide rail adapted to be secured to a floor panel of the vehicle body in its longitudinal direction, and an upper slide rail slidably fitted into the lower guide rail. The lower guide rail has a rail body, side walls, slider rest portions and upper guide walls inwardly extending from upper ends of the side walls to define an elongated guide groove. First hook segments are formed on inner edges of the upper guide walls along the elongated guide groove, and second hook segments are formed on the side walls of the lower guide rail, respectively. The upper slide rail includes a slide body, vertical wall, upper slide walls, and lower side walls. In the upper slide rail, slider rest shoulders, first engaging segments, and second engaging segments are also formed. Either one of the slider rest portions may include a rectilinear portion by which one of the sliders is held in point of contact.

13 Claims, 7 Drawing Sheets

VEHICLE SEAT SLIDE DEVICE

BACKGROUND OF THE INVENTION

1. Field of the Invention

This invention relates to seat slide devices for use in automotive vehicles and, more particularly, to a vehicle seat slide device employing an elongated lower guide rail mounted on a floor panel in its longitudinal direction, and an upper slide rail firmly secured to a vehicle seat and slidably fitted in the lower guide rail for relative movement in the longitudinal direction of the vehicle body.

2. Description of the Related Art

As is generally known, a vehicle seat assembly usually employs a seat body that includes a seat cushion and a seat back which is free to rotate. Virtually all modern motor vehicles are equipped with a seat slide mechanism to slidably support the seat body on the floor panel of the vehicle for longitudinal movement of the seat body in a longitudinal (i.e., "fore and aft") direction. With this arrangement, it is possible to design the vehicle seat's layout of a vehicle compartment into various suitable modes.

Commonly, the conventional seat slide mechanism usually includes an elongated lower guide rail extending longitudinally of the vehicle body and mounted on the floor panel of the vehicle body at a height substantially equal to that of a floor carpet, and an upper slide rail firmly secured to the seat body and slidably fitted to the lower guide rail.

A typical example of such a prior art seat slide device is shown in FIG. 1. The seat slide device 1 includes a pair of elongated lower guide rails 2 firmly secured to the floor panel of the vehicle body. Each of the lower guide rails includes an upwardly opening, substantially C-channeled rail body 2a made of metal sheet, a pair of lateral side walls 2b standing upright from distal ends of the rail body 2a, and a pair of upper walls 3 inwardly bent from respective upper edges of the lateral walls 2b and having inwardly and vertically extending flanges, respectively, to form an elongated guide groove therebetween. The lower guide rail 2 is fixedly mounted on to the floor panel at its front and rear ends by means of mounting brackets 4a and 4b.

The seat slide device 1 further includes an upper slide rail 5 that has a substantially reversed T-shape profile in cross section which is properly assembled into the lower guide rail 2. The upper slide rail 5 has a pair of vertical walls 5c fixed together by some suitable means such as welding, a pair of horizontally extending walls 5a outwardly bent from respective lower edges of the vertical walls 5c and having respective distal ends formed with upwardly bent flanges 5b, each of which serves as an engaged portion 7. The upper slide rail 5 is assembled into the lower guide rail 2 such that the engaged portions 5b engages the engaging portions 3. The vertical walls 5c is firmly secured to the bottom wall of the seat body for its sliding movement by means of an anchor member, a manual shaft of a seat lifter, and a mounting base for a reclining mechanism.

In order to achieve smooth sliding movement of the upper slide rail 5, a plurality of rollers 9a are located the horizontally extending walls 5a of the upper slide rail 5 and the rail body 2a of the lower guide rail 2, and a plurality of ball bearings 9b are disposed between the engaging portions 3 of the lower guide rail 2 and the engaged portions 5a of the upper slide rail 5. In old seat slide device, on the contrary, rollers and ball bearings are not provided between the lower guide rail and the upper slide rail, with the metal surface of the upper slide rail being held in direct contact with the metal surface of the lower guide rail for sliding movement. In this event, a sliding resistance is greater than a rolling resistance. Thus, in the old seat slide device without any rotational elements, there exists a rapid increase in sliding resistance owing to undesired deformation of the lower guide rail based on a poor bending accuracy or undesired torsion based on a poor installation of the seat slide device on the vehicle body, resulting in severe disturbance on a smooth sliding movement of the upper slide rail with noise or malfunction caused in the seat slide device. Thus, the seat slide device of FIG. 1 is advantageous over the old seat slide device.

Besides, it is conventional practice to employ a seat slide lock mechanism providing locking and unlocking positions.

Japanese Patent Application Laid-Open Publication No. H9-95163 discloses a vehicle seat device provided with a seat slide lock mechanism including a latch member and interlock member.

SUMMARY OF THE INVENTION

However, by the investigations of the present inventors, in the event that the conventional seat slide device is longitudinally formed in a manner as noted above, fabrication of various component parts are extremely troublesome, and undesired play or cranky movement of the upper slide rail relative to the lower guide rail owing to poor dimensional accuracy is caused to badly affect on sliding movement of the upper slide rail. Further, if the seat slide device is so fabricated as to have a greater strength that resists the load, then, the weight of the seat slide device adversely increases. Also, in the event that the seat slide device is mounted on to the floor panel of the vehicle body, dusts on the floor panel tends to enter the inside of the lower guide rail 2 through the guide groove thereof, causing a serious difficulty in sliding movement-of the upper slide rail 5. Thus, it was difficult to provide an improved seat slide device that properly support the weight of a seat occupant with a simple structure and low manufacturing cost.

Accordingly, it is an object of the present invention to provide a vehicle seat slide device in that a lower guide rail has an increased strength to prevent undesired distortion of an upper slide rail, wherein the lower guide rail has a narrow guide groove to prevent the entry of dusts remaining on a floor panel into the lower guide rail, wherein the upper slide rail is ensured not to disengage the lower guide rail during collisions of the vehicle or other reasons such as heavily loaded conditions.

It is another object of the present invention to provide a vehicle seat slide device which is simple in construction, easy to reduce the number of component parts while decreasing the fabricating steps, inexpensive to manufacture, easy to install the seat slide device on to the floor panel in an efficient manner for a short period of time, whereby the seat slide device provides a smooth sliding movement with a great reduction in sliding resistance thereby achieving an improved maneuverability.

To achieve the above objects, the present invention provides a vehicle seat slide device including an elongated lower guide rail adapted to be firmly fixed to a floor of a vehicle body in a longitudinal direction thereof, and an upper slide rail firmly secured to a seat body and slidably guided by the lower guide rail.

The elongated lower guide rail has a substantially upwardly opening C-channeled rail body, a pair of side walls upwardly extending from lateral distal ends of the rail body, a pair of upper guide walls inwardly extending from respective upper ends of the side walls to form a guide groove, a pair of slider rest portions formed on the respective upper ends of the side walls, a pair of first hook segments formed at respective inner distal ends of the upper guide walls, and a pair of second hook segments formed on the side walls.

The upper slide rail has a substantially downwardly opening C-channeled slide body which is slidably accommodated in the lower guide rail, and a vertical wall standing upright from the center line of the slide body and extending upward through the guide groove of the lower guide rail. The slide body has bifurcated upper slide walls extending from a lower end of the vertical wall and having their respective distal ends formed with slider rest shoulders and respective downwardly extending lower side walls. The lower side walls have their respective lower ends formed with respective second engaging segments adapted to engage the second corresponding hook segments of the lower guide rail.

According to an another aspect of the present invention, a vehicle seat slide device includes an elongated lower guide rail to be firmly secured to a floor of a vehicle body in a longitudinal direction thereof, and an upper slide rail firmly secured to a seat body and slidably guided by the lower guide rail.

The lower guide rail has a substantially upwardly opening C-channeled rail body, a pair of side walls upwardly extending from lateral distal ends of the rail body, and a pair of upper guide walls inwardly extending from respective upper ends of the side walls to provide a guide groove. The side walls have their upper ends formed with respective slider rest portions. The upper guide walls have their internal edges formed with first hook segments, and the side walls have second hook segments. The first hook segments are formed along inwardly angulated terminal edges of the upper guide walls.

The upper slide rail has a substantially downwardly opening C-channeled slide body which is slidably accommodated in the lower guide rail, and a vertical wall standing upright from the center line of the slide body and extending upward through the guide groove of the lower guide rail. The slide body has bifurcated upper slide walls outwardly extending from a lower end of the vertical wall and having its distal ends formed with respective slider rest shoulders, with the upper slide walls having respective first engaging segments adapted to engage the corresponding first hook portions of the lower guide rail. The bifurcated upper slide walls have their respective distal ends formed with downwardly extending lower side walls which have respective second engaging sections adapted to engage the corresponding second hook segments of the lower guide rail. Each of the first engaging segments of the upper slide rail forms a part of the slider rest shoulder of the upper slide wall of the upper slide rail.

According to an another aspect of the present invention, a vehicle seat slide has an elongated lower guide rail adapted to be fixedly secured to a floor of a vehicle body in a longitudinal direction thereof, and an upper slide rail firmly fixed to a seat body and slidably guided by the lower guide rail in the longitudinal direction thereof.

The lower guide rail has a substantially upwardly opening C-channeled rail body, a pair of side walls upwardly extending from lateral distal ends of the rail body, and a pair of upper guide walls inwardly extending from respective upper ends of the side walls to provide a guide groove. The side walls have their upper ends formed with respective slider rest portions, and the upper guide walls have their internal edges formed with first hook segments, and side walls have their respective second hook segments. The first hook segments are formed along inwardly angulated terminal edges of the upper guide walls.

The upper slide rail has a substantially downwardly opening C-channeled slide body which is slidably accommodated in the lower guide rail, and a vertical wall standing upright from the center line of the slide body and extending upward through the guide groove. The slide body has bifurcated upper slide walls outwardly extending from a lower end of the vertical wall and having their lateral distal ends formed with respective slider rest shoulders, and first engaging segments adapted to engage the corresponding first hook portions of the lower guide rail. The bifurcated upper slide walls has their respective downwardly extending lower side walls which have second engaging segments adapted to engage the corresponding second hook segments of the lower guide rail.

According to a further aspect of the present invention, a vehicle slide device includes an elongated lower guide rail adapted to be fixedly secured to a floor of a vehicle body in a longitudinal direction thereof, and an upper slide rail firmly secured to a seat body and slidably accommodated in the lower guide rail.

The lower guide rail includes a substantially upwardly opening C-channeled rail body, a pair of side walls upwardly extending from lateral distal ends of the rail body, and a pair of upper guide walls inwardly extending from upper ends of respective side walls to form a guide groove. The side walls have their upper ends formed with respective slider rest portions. The upper guide walls have their internal edges formed with respective first hook segments and the side walls have respective second hook segments. The first hook segments are formed along inwardly angulated terminal edges of the upper guide walls.

The upper slide rail includes a substantially downwardly opening C-channeled slide body slidably accommodated in the lower guide rail, and a vertical wall standing upright from the center line of the slide body and extending upward through the guide groove. The slide body has bifurcated upper slide walls outwardly extending from a lower end of the vertical wall and having their respective distal ends formed with respective slider rest shoulders. The upper slide walls have respective first engaging segments adapted to engage the corresponding first hook segments of the lower guide rail. The bifurcated upper slide walls have their respective distal ends formed with downwardly extending lower side walls which have respective second engaging segments adapted to engage the second hook segments of the lower guide rail. The second engaging segments are formed along outwardly angulated terminal edges of bottom ends of the lower side walls.

The elongated lower guide rail has its upper ends formed with respective finisher mounting segments on which finishers are secured to shield the guide groove of the lower guide rail.

A slider is operatively disposed between each of the shoulder rest portions of the lower guide rail and each of the slider rest shoulders of the upper slide rail. A roller is operatively disposed between the rail body of the lower guide rail and the bifurcated upper slide walls of the upper slide rail, with the roller having its distal ends located in proximity or abutting against the lower side walls of the upper slide rail.

According to a further aspect of the present invention, a vehicle seat slide device includes an elongated lower guide rail adapted to be fixed secured to a floor of a vehicle body in a longitudinal direction thereof, and an upper slide rail firmly secured to a seat body and slidably fitted in the lower guide rail.

The elongated lower guide rail has a substantially upwardly opening C-channeled rail body, a pair of side walls upwardly extending from lateral distal ends of the rail body, and a pair of upper guide walls inwardly extending from respective upper ends of the side walls to provide a guide groove. The upper guide walls have their inner surfaces formed with respective slider rest portions.

The upper slide rail has a substantially downwardly opening C-channeled slide body which is slidably accommodated in the lower guide rail, and a vertical wall standing upright from the center line of the slide body and extending upward through the guide groove. The slide body has bifurcated upper slide walls outwardly extending from a lower end of the vertical wall and having its distal ends formed with respective slider rest shoulders.

The rail body of the lower rail guide has a plurality of locking apertures. A pair of sliders are operatively disposed between the slider rest portions of the lower guide rail and the slider rest shoulders of the upper slide rail. At least one of the slider rest portions of the lower guide rail includes a rectilinear portion which slidably supports the associated slider.

According to a further aspect of the present invention, a vehicle seat slide device includes an elongated lower guide rail adapted to be firmly secured to a floor of a vehicle body in a longitudinal direction thereof, and an upper slide rail firmly secured to a seat body and slidably fitted in the lower guide rail.

The elongated lower guide rail has a substantially upwardly opening C-channeled rail body, a pair of side walls upwardly extending from lateral distal ends of the rail body, and a pair of upper guide rails inwardly extending from respective upper ends of the side walls to provide a guide groove. The upper guide walls have their inner surfaces formed with respective slider rest portions.

The upper slide rail has a substantially downwardly opening C-channeled slide body which is slidably fitted in the lower guide rail, and a vertical wall standing upright from the center line of the slide body and extending upward through the guide groove of the lower guide rail. The slide body has bifurcated upper slide walls outwardly extending from a lower end of the vertical wall and having its distal ends formed with respective slider rest shoulders.

The rail body of the lower rail guide has a plurality of locking apertures. A pair of sliders are operatively disposed between slider rest portions of the lower guide rail and the slider rest shoulders of the upper slide rail. The sliders have hollow portions, respectively.

According to a further aspect of the present invention, a vehicle seat slide device includes an elongated lower guide rail adapted to be firmly secured to a floor of a vehicle body in a longitudinal direction thereof, and an upper slide rail firmly secured to a seat body and slidably fitted in the lower guide rail.

The elongated lower guide rail has a substantially upwardly opening C-channeled rail body, a pair of side walls upwardly extending from lateral distal ends of the rail body, and a pair of upper guide walls inwardly extending from upper ends of the side walls to provide a guide groove. The upper guide walls have their inner surfaces formed with respective slider rest portions.

The upper slide rail has a substantially downwardly opening C-channeled slide body which is slidably fitted in the lower guide rail, and a vertical wall standing upright from the center line of the slide body and extending upward through the guide groove of the lower guide rail. The slide body has bifurcated upper slide walls outwardly extending from a lower end of the vertical wall and having its distal ends formed with respective slider rest shoulders.

The rail body of the lower guide rail has a plurality of locking apertures. A pair of sliders are operatively disposed between the slider rest portions of the lower guide rails and the slider rest shoulders of the upper slide rail. At least one of the slider rest portions of the lower guide rail includes a rectilinear portion which slidably supports the associated slider. The sliders have their peripheries formed with slits, respectively.

Other and further features, advantages, and benefits of the invention will become more apparent from the following description taken in conjunction with the following drawings. It is to be understood that the foregoing general description and the following detailed description are exemplary and explanatory but are not to be restrictive of the invention.

The accompanying drawings which are incorporated in and constitute a part of the invention, illustrate embodiments of the invention and, together with the description, serve to explain the principles of the invention in general terms. Like numerals refer to like parts throughout the disclosure.

DETAILED DESCRIPTION OF THE PREFERRED EMBODIMENTS

Figure 2:
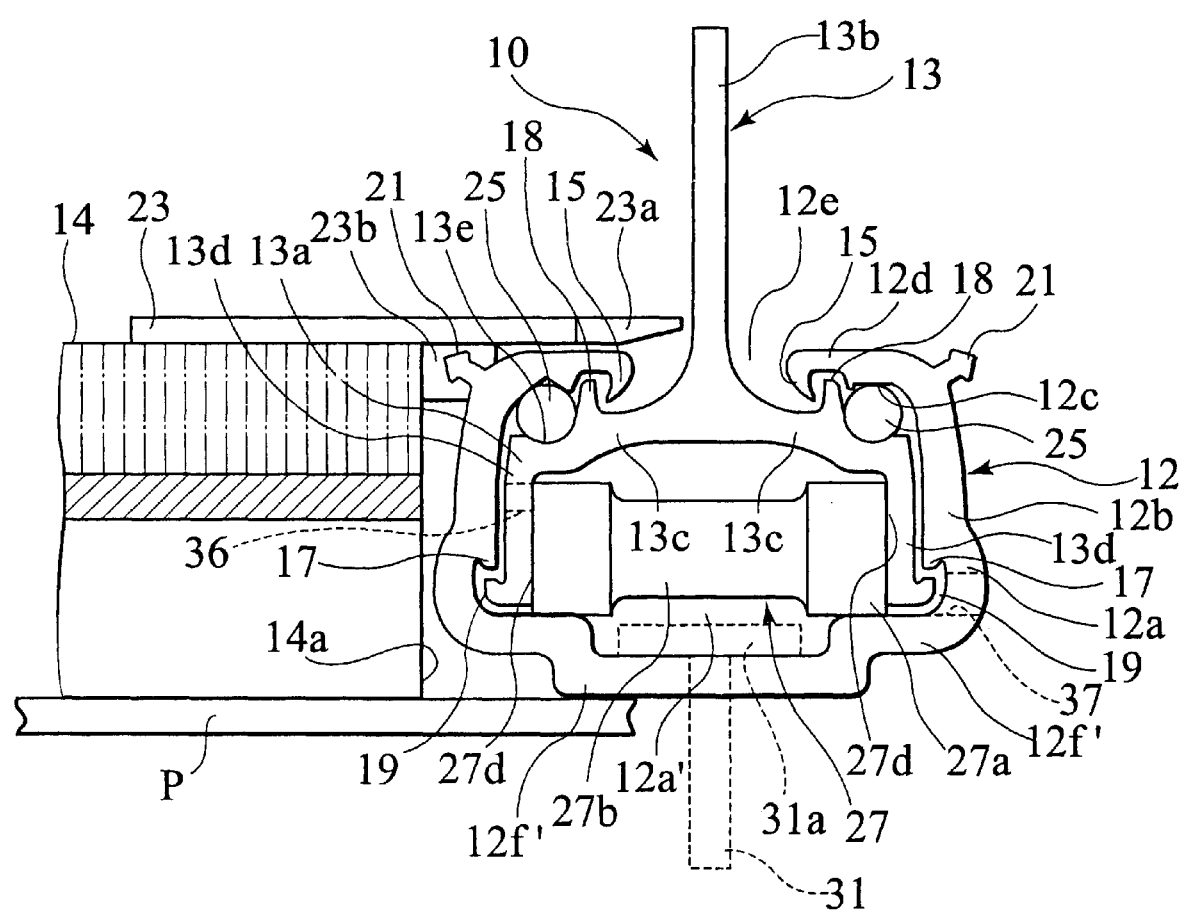
FIG. 2 is a schematic cross sectional view of a preferred embodiment of a vehicle seat slide device according to the present invention.

Referring now to FIG. 2, there is shown a preferred embodiment of a vehicle seat slide device according to the present invention. The vehicle seat slide device 10 is usually mounted onto a vehicle structure such as a floor panel P of a vehicle body to moveably support the vehicle seat in a longitudinal direction, i.e., fore and aft directions of the vehicle body.

In FIG. 2, the vehicle seat slide device 10 includes an elongated lower guide rail 12 serving as a lower track and an upper slide rail 13 slidably fitted in the lower guide rail 12, which serves as a second track for relative movement in fore and aft directions. Each of the lower and upper rails 12 and 13 may include a single elongated piece of extruded aluminum or magnesium, or a single elongated piece of plastic formed by injection molding. The elongated lower guide rail 12 is shown as being located in a cutout 14a of a floor carpet 14, but may be firmly secured to a suitable part (not shown) of the vehicle body by means of mounting brackets. On the contrary, the upper slide rail 13 is fixedly secured to a bottom wall of a seat body of a vehicle seat (not shown).

The elongated lower guide rail 12 includes a substantially upwardly opening C-channeled rail body 12a, a pair of vertical side walls 12b, 12b upwardly extending from lateral distal ends of the rail body 12a to provide an elongated cavity 12a', a pair of substantially rounded slider rest portions 12c, 12c formed on inner surfaces of respective upper ends of the side walls 12b, 12b, and a pair of upper guide walls 12d, 12d inwardly bent from the upper ends of the side walls 12b, 12b to define an elongated guide groove 12e therebetween. The rail body 12a has a horizontal center bottom wall 12f and a pair of planar stepped segments 12f', 12f' laterally extending outward from both distal ends of the bottom wall 12f to be contiguous with the side walls 12b, 12b. One of the pair of substantially rounded slider rest portions 12c, 12c has a V-shaped groove for positioning its corresponding slider 25. The stepped segments 12f', 12f' serve as tracks for supporting a roller which will be discussed below.

The upper slide rail 13 includes a substantially downwardly opening C-channeled slide body 13a adapted to be slidably fitted in the lower guide rail 12. The slide body 13 includes a vertical wall member 13b standing upright from the center line of the slide body 13a and upwardly extending through the guide groove 12e of the lower guide rail 12, bifurcated upper slide walls 13c, 13c laterally extending from a lower end of the vertical wall 13b, and downwardly extending lower side walls 13d, 13d having their respective upper ends contiguous with lateral distal ends of the upper walls 13c, 13c. The slide body 13a also has a pair of substantially rounded slider rest shoulders 13e, 13e that face the corresponding slider rest portions 12c, 12c of the lower guide rail 12. A seat locking mechanism is located between the lower guide rail 12 and the upper slide rail 13 in a manner as will be discussed later.

Figure 1:
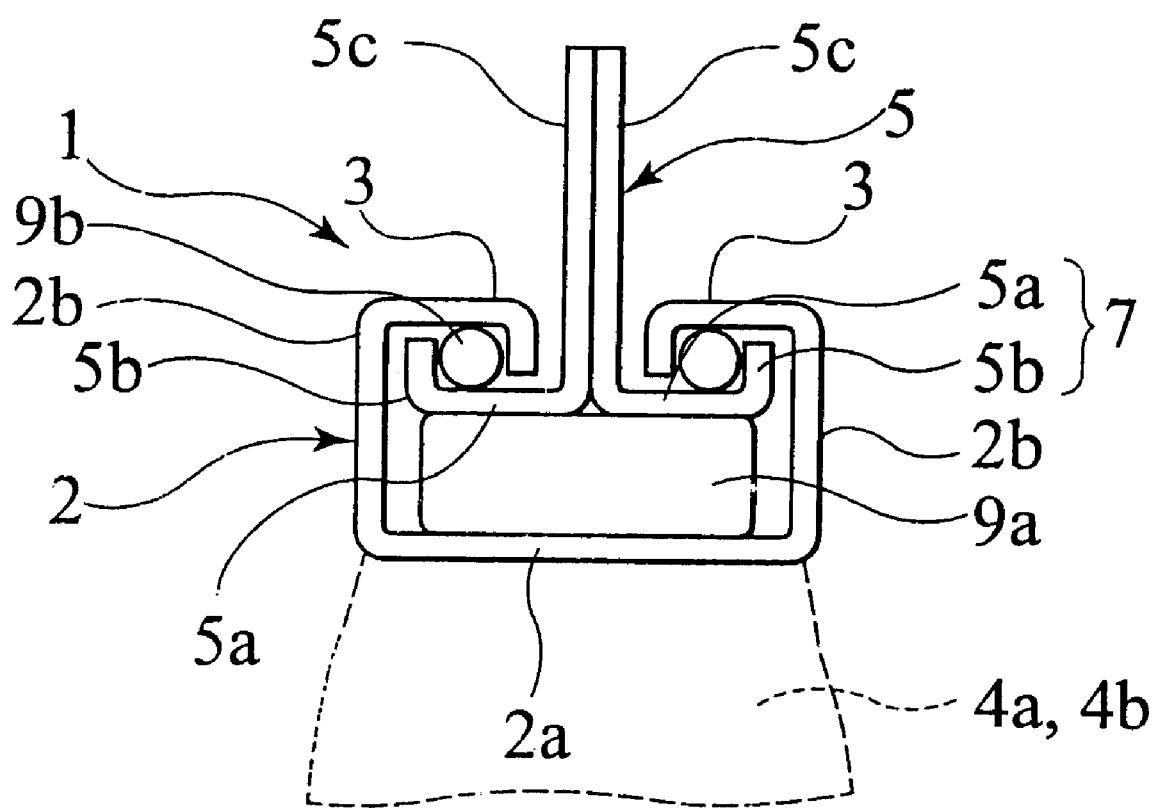
FIG. 1 is a schematic cross sectional view of a prior art vehicle seat slide device.

As shown in FIG. 1, the rail body 12a of the elongated lower guide rail 12 has their upper guide walls 12d, 12d formed at their inner distal ends with first hook segments 15, 15 that defines the elongated guide groove 12e. Second book segments 17, 17 are formed on respective inner sides of the side walls 12b, 12b at locations near respective lower ends of the vertical side walls 12b, 12b. The first hook segments 15, 15 are defined by inwardly angulated portions formed at inner edges of respective upper guide walls 12d, 12d along the elongated guide groove 12e, respectively. On the contrary, the second hook segments 17, 17 are defined by downwardly extending edges formed near the lower ends of the respective vertical side walls 12b, 12b. In addition, a pair of finisher mounting segments 21, 21 are formed by outwardly and obliquely extending projections formed in the vicinities of junctions between the vertical side walls 12b, 12b and the upper guide walls 12d, 12d. These finisher mounting segments 21, 21 are coupled to finishers 23, 23 which are secured to a floor panel 14.The seat slide device 10 may be used as a usual seat position adjusting device mounted on to-the floor panel 14 by means of mounting brackets.

Figure 3:
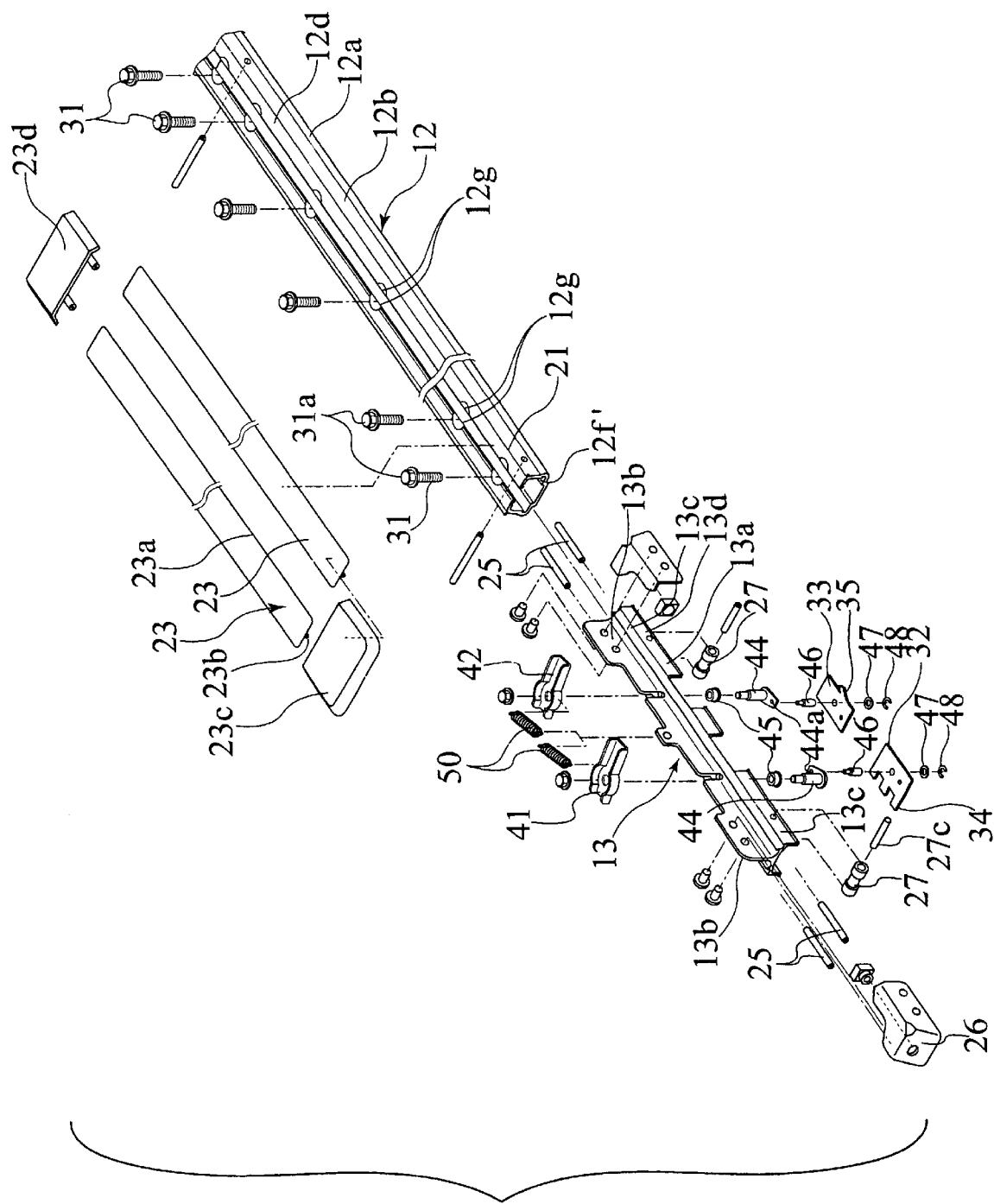
FIG. 3 is an exploded perspective view of the seat slide device of FIG. 2.

As shown in FIGS. 2 and 3, the finishers 23, 23 are formed by plastic and include soft lip portions 23a, 23a, respectively, that are formed at elongated inner edges of the finishers 23, 23, respectively. The finishers 23, 23 have their rear sides formed with engaging segments 23b, 23b, respectively. The engaging segments 23b, 23b serve to engage the respective finisher mounting segments 21, 21 of the lower guide rail 12. In this manner, the soft lip portions 23a, 23a of the respective finishers 23, 23 are held in sliding contact with both sides of the vertical wall 13b of the upper slide rail 13, thereby shielding the elongated guide groove 12e defined by the upper guide walls 12d, 12d of the lower guide rail 12 from dusts appearing on the floor panel 14.The finishers 23, 23 have front and rear ends coupled to end caps 23c, 23d, respectively, that are fixedly mounted on the structural portion of the vehicle body.

Turning now to FIG. 2, the upper slide rail 13 has a pair of first upwardly extending engaging segments 18, 18 formed on the respective upper surfaces of the upper slide walls 13c, 13c in the vicinities of the slider rest shoulders 13e, 13e of the slide body 13a to engage the corresponding first hook segments 15, 15 of the lower guide rail 12. The first engaging segments 18 include upwardly extending projections. Likewise, the slide body 13a also has second engaging segments 19, 19 formed at respective lower ends of the lower side walls 13d, 13d to engage the corresponding second hook segments 17, 17 of the lower guide rail 12.

The second engaging segments 19, 19 are defined by outwardly and slightly, upwardly angulated projections formed at respective lower ends of the vertical side walls 13d, 13d. The first engaging segments 18, 18 of the slide body 13a form parts of the rounded slider rest shoulders 13e, 13e formed near the upper lateral distal ends of the respective upper slide walls 13c, 13c.

Sliders 25, 25 are operatively disposed between the slider rest portion 12c, 12c of the lower guide rail 12 and the corresponding slider rest shoulders 13e, 13e of the upper slide rail 13. As seen in FIGS. 2 and 3, a pair of rollers 27 are disposed at fore and aft positions between the planar stepped segments 12f', 12f' of the bottom wall 12f of the lower guide rail 12 and the upper slide walls 13c, 13c of the upper slide rail 13 for smooth sliding movement in fore and aft directions of the vehicle body. Each of the rollers 27 has a roller shaft 27c composed of a central shaft portion.

As shown in FIG. 2, each of the rollers 27 has both sides 27a, 27a that are larger in diameter than a central shaft portion 27b. The both sides 27a, 27a of the roller 27 are placed on the planar stepped segments 12f', 12f' of the bottom wall 12f of the rail body 12a, thereby providing a wide space between the bottom wall 12f of the rail body 12a and the central shaft portion 27b of the roller 27. With this arrangement, head portions 31a of fastener bolts 31 do not interfere with the roller 27 during movement thereof when the bolts 31 are fastened to the floor panel of the vehicle body.

As shown in FIG. 3, the roller 27 has a center bore through which a shaft 27c extends and has its both ends supported by the lower side walls 13d, 13d of the upper slide rail 13 for smooth rotation of the roller 27. As seen in FIG. 2, the roller 27 has its outermost end walls 27d, 27d held in sliding contact with or in proximity with the lower side walls 13d, 13d of the upper slide rail 13. Under this circumstance, even if the vertical wall 13b is subjected to a strong upward jerk, the lower side walls 13d, 13d of the upper slide rail 13 are prevented from being inwardly deformed.

As shown in FIG. 3, the lower guide rail 12 has a plurality of cutouts 12g formed at desired locations of the upper guide walls 12d, 12d to provide ease of access of the fastening bolts 31. The bolts 31 are secured to the floor panel of the vehicle body to fixedly support the lower guide rail 12 on the floor panel. The seat slide device 10 also includes front and rear mounting brackets 26 for mounting the front and rear ends of the lower guide rail 12 on to the floor panel of the vehicle body therethrough, with only front bracket 26 being shown in FIG. 3.

Figure 4:
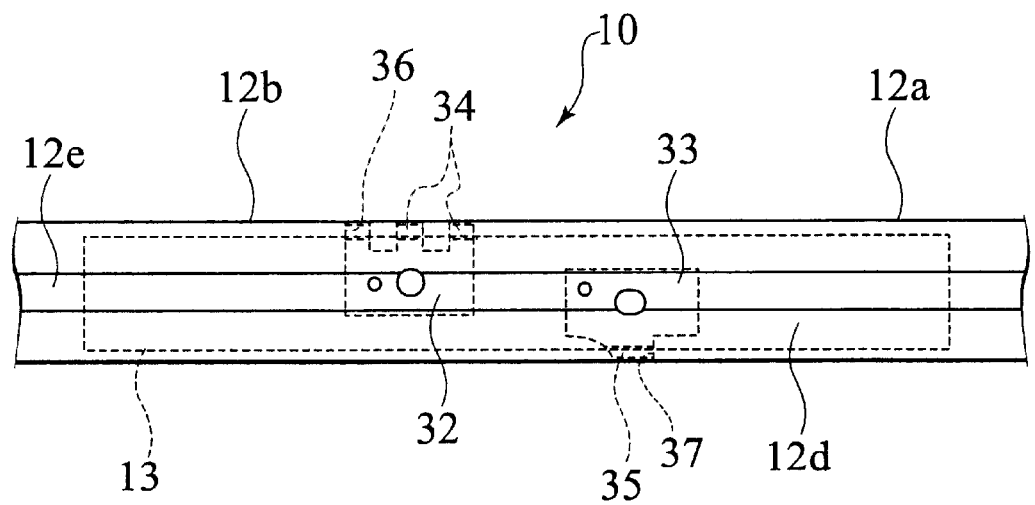
FIG. 4 is an enlarged plan view of the vehicle seat slide device of FIG. 2.

As shown in FIGS. 3 and 4, the seat slide device 10 further comprises the seat locking mechanism, which includes a latch plate 32, an interlocking member 33 and manual levers 41 and 42 for actuating the latch plate 32 and the interlocking member 33, respectively. The latch plate 32 has segmented teeth 34 that is laterally moveable so as to engage selected ones of a series of latching apertures 36 formed in one of the vertical side walls 12b, 12b of the rail body 12a. The interlocking member 33 is also laterally moveable and has a laterally extending interlocking pawl 35 that is adapted to engage an interlocking hole 37. The latch plate 32 is coupled to the manual lever 41 by means of a locking shaft 44 having an actuator segment 44a, together with a bush 45 as an upper intermediate member, a rivet lock 46, a wave washer 47 and an E-shape ring 48 each as a lower intermediate member. Likewise, the interlocking member 33 is coupled to the manual lever 42 preferably by means of a locking shaft 44 having an actuator segment 44a, a bush 45 as an upper intermediate member, a rivet lock 46, a wave washer 47 and an E-shape ring 48 each as a lower intermediate member. Springs 50 are connected to the manual levers 41, 42 to urge the manual levers 41, 42 toward their locking positions, respectively.

During assembly of the seat slide device 10, the shafts 27c are initially inserted through the rollers 27 and their ends are coupled to the lower side walls 13d, 13d of the upper slide rail 13. The latch plate 32 and the interlocking member 33 are coupled to the manual levers 41, 42, respectively and fixed in place by the E-rings 48, 48. The upper slide rail 13 thus assembled is then nI;J inserted into the elongated cavity 12a' of the lower guide rail 12. The sliders 25 are fitted to spaces between the slider rest portions 12c, 12c of the lower guide rail 12 and the slider test shoulders 13e, 13e of the upper slide rail 13. The front and rear mounting brackets 26 are then coupled to the front and rear ends of the lower guide rail 12 and fixed thereto by some suitable means. Finally, the finishers 23 are secured to the floor carpet 14 (see FIG. 2) by means of the end caps 23c, 23d such that the lips 23a of the fishers 23 are brought into contact with both sides of the vertical wall 13b of the upper slide rail 13 to shield the elongated guide groove 12e thereof.

In actual practice, a pair of the seat slide devices 10 are laterally spaced and fixedly secured to the floor panel of the vehicle body in the longitudinal direction thereof. The seat body is fixedly secured to the upper guide rail 13 by some suitable bracket means (not shown).

In operation, a seat occupant manipulates the levers 41 and 42 to disengage the latch plate 32 and the interlocking member 33 from the latching apertures 36 and the interlocking hole 37, respectively, for actuating the interlocking mechanism into its unlocked position. The vehicle occupant then pushes or pulls the seat body in fore and aft directions of the vehicle body. When the seat is moved in the longitudinal direction to a desired position, the manual levers 41 and 42 are released and the latch plate 32 and the interlocking member 33 are brought into locking engagement with latching apertures 36 and the interlocking hole 37, respectively, whereby the seat can be releasably locked in a desired horizontally-adjusted position.

According to the particular embodiment shown, when the upper guide rail 12 and the upper slide rail 13 are subjected to a separating load from upward and downward directions during collisions, the first engaging segments 18, 18 are brought into engagement with the first hook segments 15, 15 of the lower rail guide 12. In the event that the separating load further acts on the seat slide device 10, the lower guide rail 12 and the upper slide rail 13 are partially deformed and the upper slide rail 13 is pulled upward. In this instance, the second engaging segments 19, 19 of the upper slide rail 13 are also brought into engagement with the second hook segments 17, 17 of the lower guide rail 12. In this manner, even if the upper slide rail 13 is subjected to a large upward jerk, the upper slide rail 13 is prevented from being disengaged from the lower guide rail 12. Thus, the vehicle seat slide device 10 is ensured in primary and secondary steps to be maintained in its desired operative and safety condition in a simple and highly reliable manner during collision or sudden stop of the running vehicle. The second hook segments 17, 17 of the lower guide rail 12 and the second engaging segments 19, 19 of the upper guide rail 13 may be dispensed with if desired.

Figure 5:
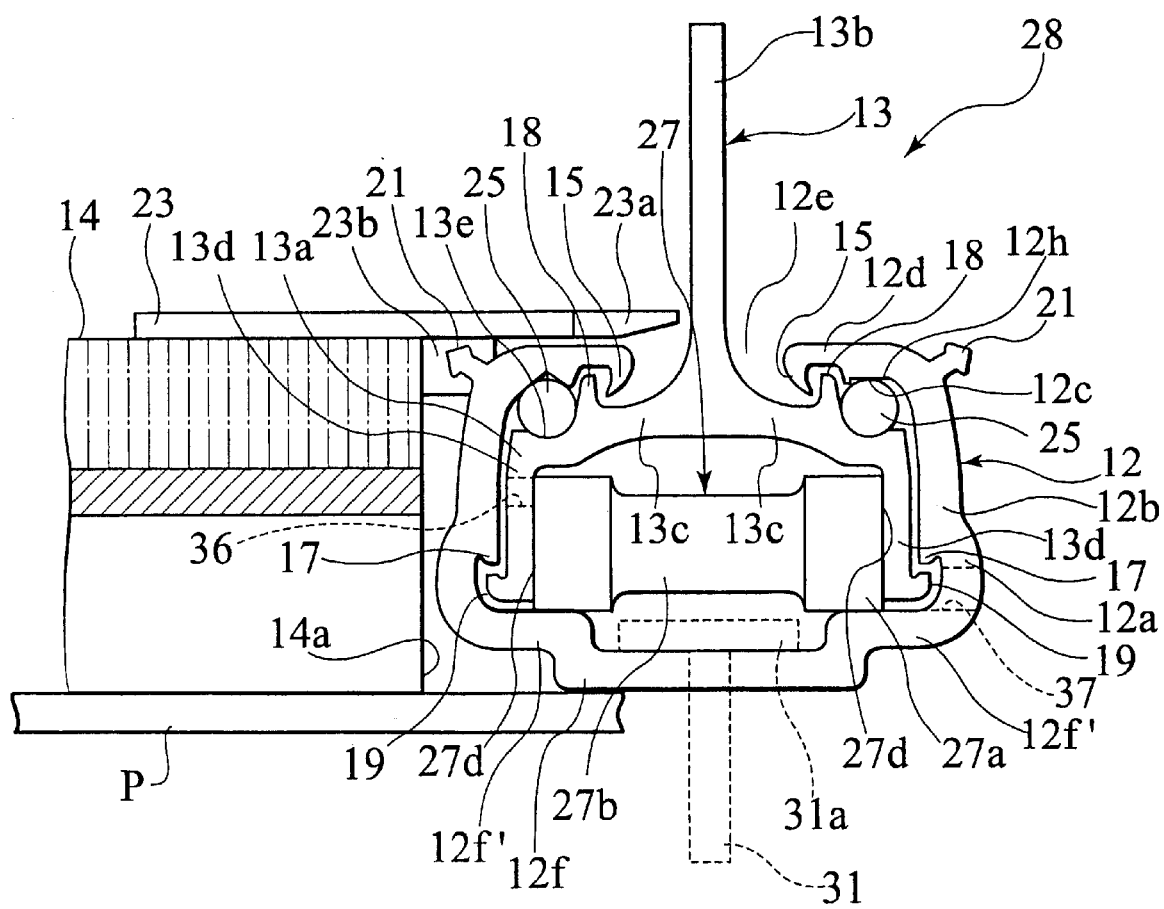
FIG. 5 is a schematic cross sectional view of another preferred embodiment of a vehicle seat slide device according to the present invention.
Figure 6A:
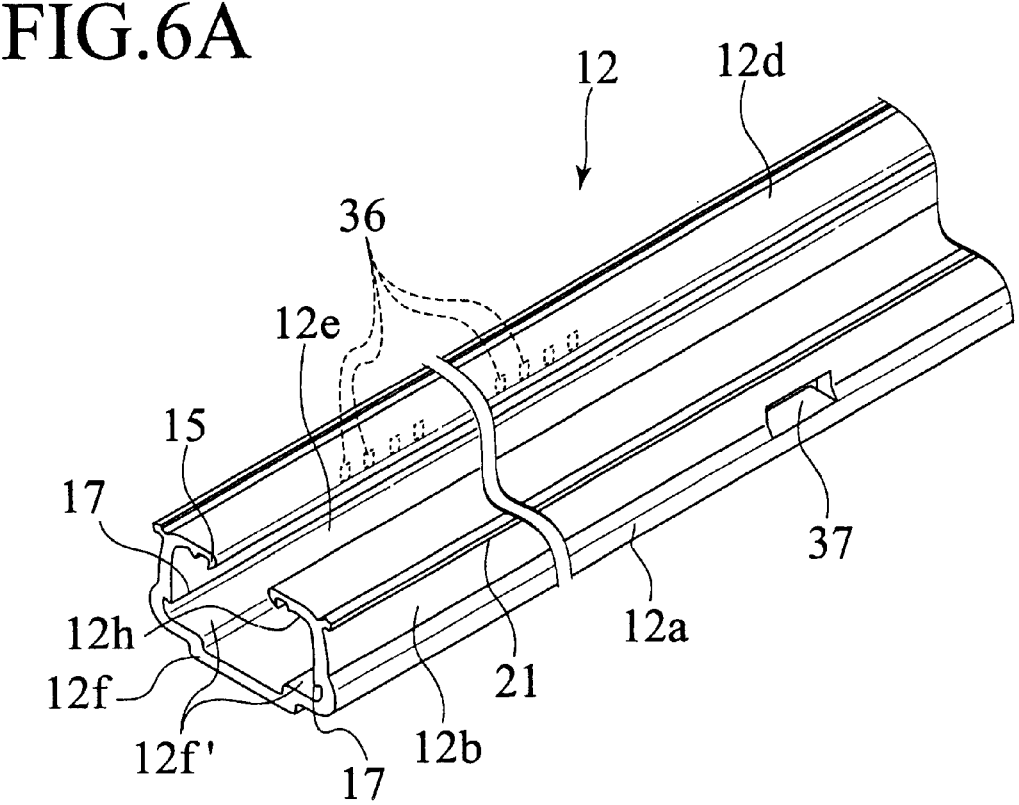
FIG. 6A is an enlarged perspective view of an elongated lower guide rail of the vehicle seat slide device of FIG. 5.
Figure 6B:
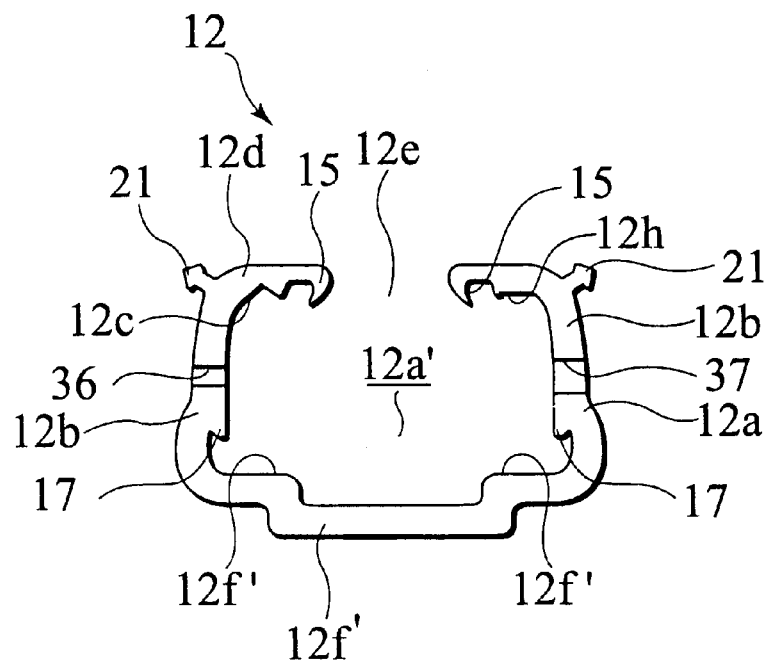
FIG. 6B is across sectional view of the lower guide rail of FIG. 6A.

FIGS. 5 and 6A, 6B show another preferred embodiment of a vehicle seat slide device 28 according to the present invention, with like parts bearing the same reference numerals as those used in FIGS. 2 to 4. The vehicle seat slide device 28 shown in FIG. 5 is identical in construction with that shown in FIGS. 2 to 4 except that the other of the slider rest portions 12c, 12c of the lower guide rail 12 is configured to have an elongated rectilinear portion 12h. The elongated rectilinear portion 12h allows to support the slider 25 relative to the vertical side walls 12b, 12b of the lower guide rail 12 so as to absorb cranky or rickety movement of the upper slide rail 13 relative to the lower guide rail 12 owing to poor dimension accuracy caused by fabrication of components. This structure makes it possible to support the slider 25 with a point of contact between the upper slide rail 13 and the lower guide rail 12 without causing any cranky movement of the upper slide rail 13 in upward or downward directions, even when the components are inaccurately fabricated, such that the smooth sliding movement of the upper slide rail 13 is reliably ensured. In the event that both of the slider rest portions 12c, 12c of the lower guide rail 12 include the rectilinear portions, the upper slide rail 13 is subjected to cranky movement within the lower guide rail 12, but, if only one of the slider rest portions 12c, 12c includes the rectilinear sliding portion, undesired cranky movement of the upper slide rail 13 is effectively prevented.

Figure 7:
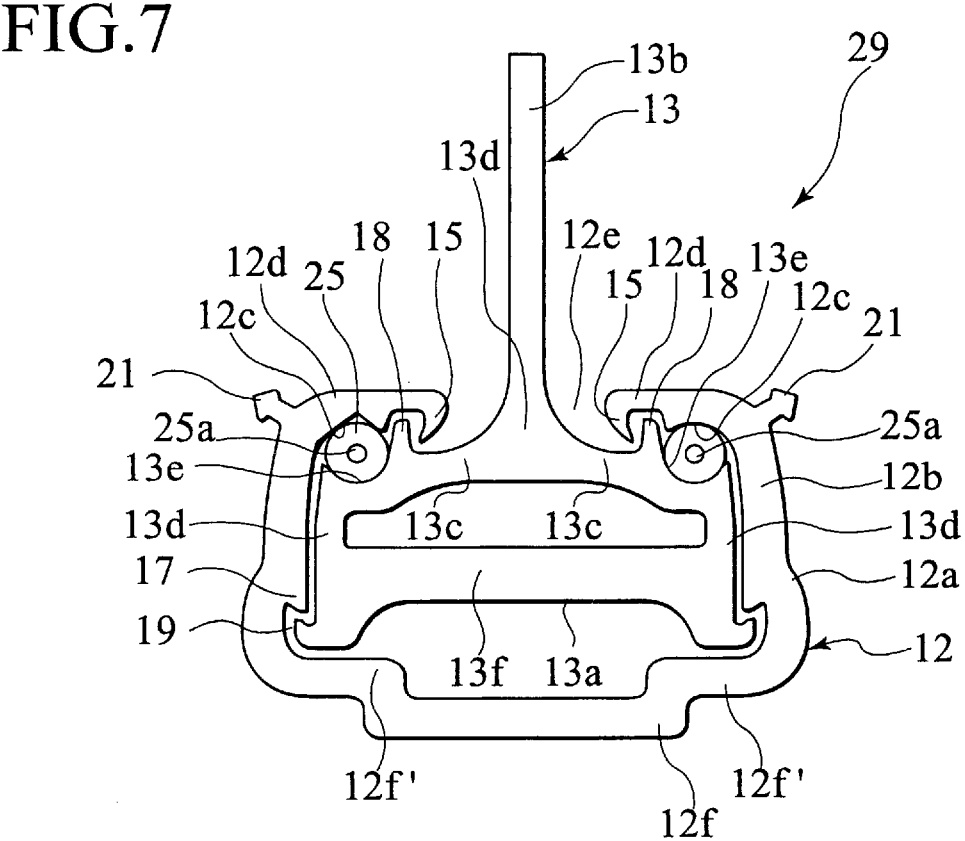
FIG. 7 is a schematic cross sectional view of another preferred embodiment of a vehicle seat slide device according to the present invention.

FIG. 7 shows still another preferred embodiment of a vehicle seat slide device according to the present invention, with like parts bearing like reference numerals as used in FIG. 2. In the preferred embodiment of a seat slide device 29 of FIG. 7, a pair of bottom walls 13f are integrally formed with the lower side walls 13d, 13d at fore and aft positions of the upper slide rail 13 to provide an intermediate space for accommodating the rollers 27, the component parts of the interlocking mechanism and its associated parts, thereby providing an increased strength to the lower side walls 13d, 13d of the upper slide rail 13. The bottom walls 13f of the upper slide rail 13 have their opposing ends formed with downwardly curved portions. In addition, each of the sliders has a cavity or through-hole 25a. Owing to the cavities 25a, the sliders 25 are ensured to absorb the cranky movement of the upper slide rail 13 due to the lateral inaccurate dimensions of the upper slide rail 13 to achieve the smooth sliding movement thereof. Therefore, the width of the elongated guide groove 12e of the lower guide rail 12 can be minimized, thereby preventing the dusts on the floor panel from entering the inside of the lower guide rail 12.

Figure 8:
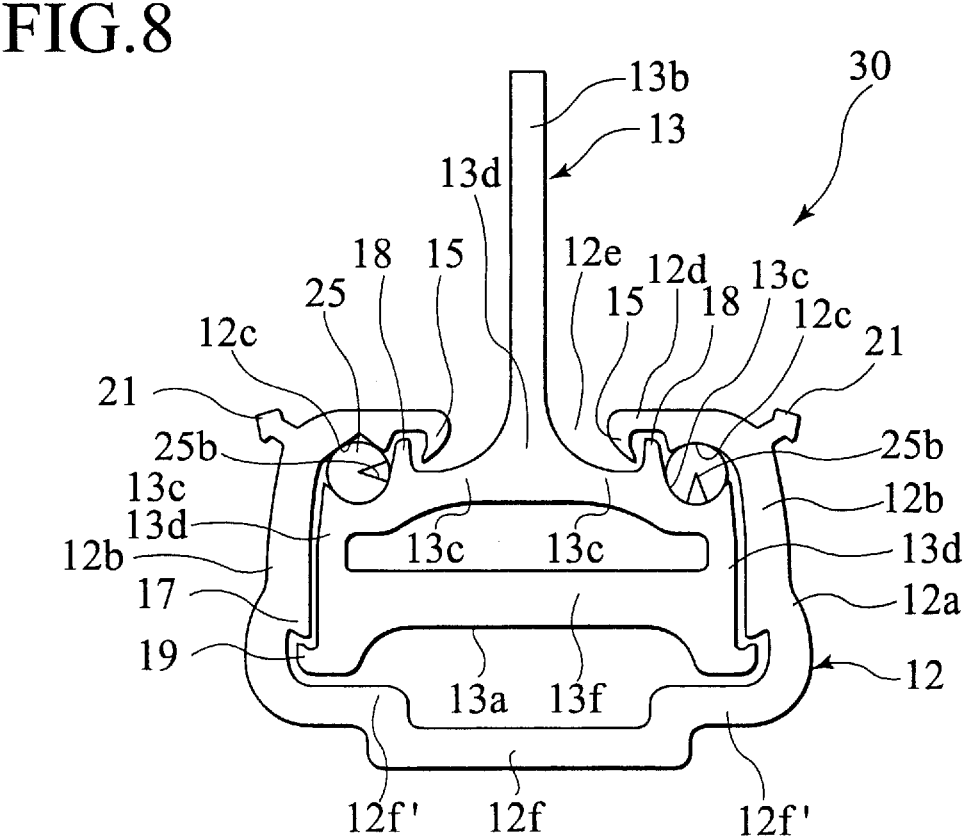
FIG. 8 is a schematic view of another preferred embodiment of a vehicle seat slide device according to the present invention.

FIG. 8 shows a modified form of the vehicle seat slide device of FIG. 7, with like parts bearing like reference numerals as those used in FIG. 7. The vehicle seat slide device 30 is identical in construction with that shown in FIG. 7 except that each of the sliders 25 has its outer periphery formed with an elongated slit 25b extending in a longitudinal direction of the slider 25. If the slit 25b is laterally formed on the slider 25, then the slider 25 can admit its deformation in upward or downward directions. If, on the contrary, the slit 25b is formed to align on a vertical line of the slider 25, then, the slider 25 can be deformed in rightward or leftward directions thereof. Thus, in the modification of the vehicle seat slide device 30 of FIG. 8, it is also possible to absorb the cranky movement of the upper slide rail 13 due to inaccurate dimensions thereof, thereby preventing the cranky movement of the upper slide rail 13 in its upward or downward, or lateral directions relative to the lower guide rail 12.

Figure 9A:
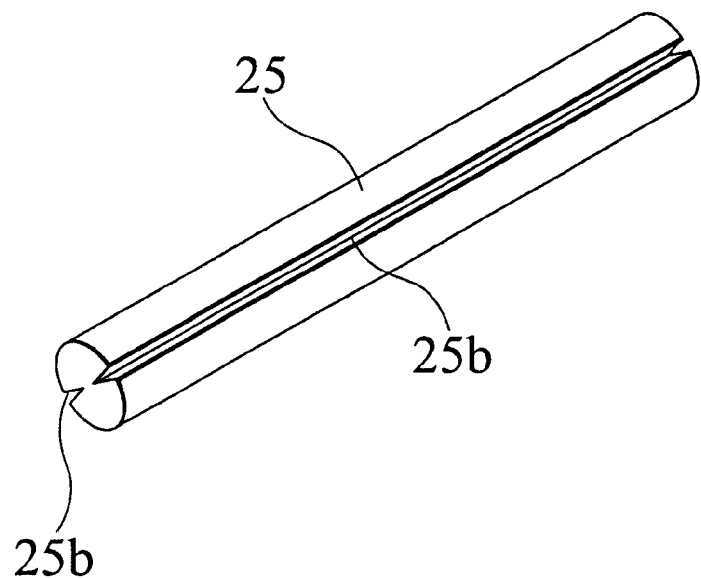
FIG. 9A is a perspective view of a modified form of a slider of the vehicle seat slide device of FIG. 8.
Figure 9B:
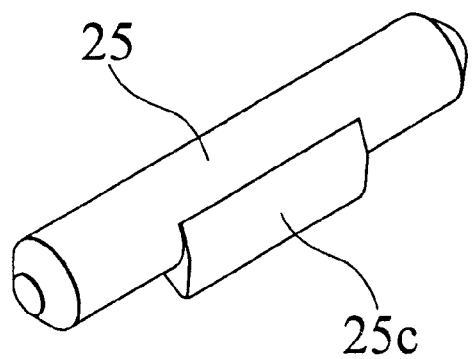
FIG. 9B is a perspective view of another modified form of a slider of the vehicle seat slide device of FIG. 8.

Although, in the modification of the vehicle seat slide device 30 shown in FIG. 8, the slider 25 has a single slit 25b, the slider 25 may have more than two slits 25b as shown in FIG. 9A. The slider 25 may be further modified such that it has an elongated leg 25c projecting outward from an outer periphery of the slider 25 as shown in FIG. 9B. In this modification, the slider rest portion 12c of the lower guide rail 12 may be configured to have an elongated slot to accommodate the leg 25c of the slider 25 such that rotation of the slider 25 is prevented while fore and aft displacement of the slider 25 is also prevented.

In the modifications of FIGS. 8, 9A and 9B, either one of the slider rest portions 12c of the lower guide rail 12 may include the rectilinear sliding portion 12h as shown in the embodiment of the seat slide device 29 of FIG. 7.

With the embodiments and modifications thereof discussed above, the present invention provides various advantages over the prior art vehicle seat slide device.

In accordance with one feature of the present invention, since each of the lower guide rail and the upper slide rail having the hook segments and the engaging segments cooperating therewith is made by a single piece of extruded aluminum or magnesium or a single piece of plastic formed by injection molding, the seat slide device has a lightweight, a simple structure and increased strength in structure. Also, the hook segments of the lower guide rail and the engaging segments of the upper guide rail have an increased strength. Therefore, even when the seat slide device is subjected to a large upward jerk, the upper slide rail is prevented from disengaging from the lower guide rail in a highly reliable manner, thereby preventing serious deformation of the lower guide rail and the upper slide rail during collisions. Further, the number of component parts are reduced and the fabrication steps or the assembly process cab be simplified, thereby giving contribution to the reduction in manufacturing costs. In addition, the seat slide device of the present invention provides a smooth and stable sliding movement in the longitudinal direction of the vehicle body while remarkably reducing the sliding resistance to thereby improve the maneuverability.

According to another feature of the present invention, since the first engaging segments of the upper slide rail form parts of the slider rest shoulders to provide a first reinforcement while the lower rail guide has a pair of first hook segments formed along the edge of the elongated guide groove to provide a second reinforcement, the lower guide rail and the upper slide rail have light weight but have remarkably increased strengths. Since, further, owing to the reinforced structures, the hook segments of the lower rail guide and the engaging segments of the upper slide rail have increased strengths and, therefore, the width of the elongated guide groove can be minimized to effectively prevent the dusts on the floor panel from entering the inside of the lower guide rail.

According to another feature of the present invention, the sliders are accommodated between the slider rest portions of the lower guide rail and the slider rest shoulders of the upper guide walls and the rollers are disposed between the bottom wall of the lower guide rail and the upper slide walls of the upper slide rail, the lower guide rail and the upper slide rail have a lowered weight but an increased strength. Consequently, even if the upper slide rail is subjected to the large upward jerk during the collisions or the heavily loaded conditions, a deformation of the lower guide rail or the upper slide rail is minimized and a smooth sliding movement is ensured in the vehicle seat slide device with a simplified structure. The vehicle seat slide device of the present invention also has a longer durability by which the vehicle seat slide device can operate in a highly reliable manner for longer period of time to provide an improved maneuverability for the vehicle occupant.

According to another feature of the present invention, since the lower guide rail of the vehicle seat slide device is formed with the pair of finisher mounting segments by which the finishers are fixed to mount the vehicle slide device on to the floor panel of the vehicle body such that the lip portions of the finishers are held in sliding contact with the vertical wall of the upper slide rail, the elongated guide groove of the lower guide rail is effectively shielded. Thus, the dusts on the floor panel do not enter the inside of the lower guide rail. Since, also, the rollers are interposed between the lower side walls of the upper slide rail, an excessive deformation of the upper slide rail is reliably prevented during the collisions or the heavily loaded conditions of the vehicle and, therefore, the disengagement of the upper slide rail from the lower guide rail is effectively avoided to prevent a malfunction of the vehicle seat slide device in a highly reliable manner.

According to a further feature of the present invention, since a pair of sliders are disposed between the slider rest portions of the lower guide rail and the slider rest shoulders of the upper slide rail and either one of the slider rest portions of the lower guide rail includes the rectilinear portion such that one of the sliders is held by the rectilinear portion, the lateral cranking movement of the upper slide rail due to its poor dimension accuracy is absorbed to provide a smooth sliding movement. With this arrangement, the width of the elongated guide groove of the lower guide rail is reduced to minimize the entry of dusts on the floor panel into the inside of the lower guide rail.

According to a further feature of the present invention, since the sliders are disposed between the slider rest portions of the lower guide rail and the slider rest shoulders of the upper slide rail and the sliders have cavities extending therethrough, the sliders function to absorb the lateral cranking movement of the upper slide rail relative to the lower guide rail owing to the poor dimension accuracy of the component parts, thereby providing the smooth sliding movement of the upper slide rail. In this instance, also, the width of the elongated guide groove is decreased to effectively prevent the entry of dusts into the inside of the lower guide rail.

According to a further feature of the present invention, since the sliders are disposed between the slider rest portions of the lower guide rail and the slider rest shoulders of the upper slide rail and either one of the slider rest portions of the lower guide rail includes the rectilinear portion wherein the sliders have slits or recessed portions extending along the length of the sliders, the lateral cranky movement of the upper slider rail relative to the lower guide rail is effectively prevented to obtain the smooth sliding movement of the upper slide rail. Also, the width of the elongated guide groove of the lower guide rail is decreased to minimize the entry of the dust into the inside of the lower guide rail.

The entire contents of a Patent Application No. TOKUGANHEI 11-371372 with a filing date of Dec. 27, 1999 in Japan and those of a Patent Application No. TOKUGANHEI 11-374733 with a filing date of Dec. 28 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vehicle seat slide device for a vehicle body, comprising:
    an elongated lower guide rail adapted to be secured to a floor panel of the vehicle body in a longitudinal direction thereof and including a substantially upwardly opening C-shaped channeled rail body having a pair of laterally spaced upwardly extending side walls, a pair of upper guide walls inwardly extending from upper ends of the side walls to define an elongated guide groove, slider rest portions formed at the upper ends of the side walls, first hook segments formed at inner edges of the respective upper guide walls along the elongated guide groove, and second hook segments formed on the side walls, respectively; and
    an upper slide rail adapted to be firmly fixed to a seat body and slidably fitted into the lower guide rail for slidable movement relative to the lower guide rail, said upper slide rail including a substantially downwardly opening C-channeled slide body accommodated in the lower guide rail and having a vertical wall standing upright from a center line of the slide body and extending upward through the elongated guide groove, bifurcated upper slide walls extending outwardly of a lower end of the vertical wall, downwardly extending lower side walls formed at lateral distal ends of the upper slide walls, slider rest shoulders formed on the upper slide walls and adapted to engage the first hook segments of the lower guide rail, respectively, and second engaging segments formed at lower ends of the lower side walls, respectively, and adapted to engage the second hook segments of the lower guide rail,
    wherein a pair of sliders are operatively disposed between the slider rest portions of the lower guide rail and the slider rest shoulders of the upper slide walls,
    and wherein only one of the slider rest portions of the lower guide rail includes a rectilinear portion which is in contact with the corresponding one of the sliders.

2. A vehicle seat slide device according to claim 1, wherein the first hook segments include inwardly angulated edges formed at inward distal ends of the upper guide walls of the lower guide rail along the elongated guide groove of the lower guide rail.

3. A vehicle seat slide device according to claim 2, wherein the first engaging segments of the upper slide rail include upwardly extending projections formed inwardly of the slider rest shoulders and form parts of the slider rest shoulders.

4. A vehicle seat slide device according to claim 2, wherein the second engaging segments include outwardly angulated projections formed at lower ends of the lower side walls, respectively.

5. A vehicle seat slide device according to claim 1, wherein at least one roller is disposed between the rail body of the lower guide rail and the upper slide walls of the upper slide rail.

6. A vehicle seat slide device according to claim 5, wherein the roller has extreme ends held in sliding contact with the lower side walls of the upper slide rail.

7. A vehicle seat slide device according to claim 5, wherein the roller has extreme ends placed in close proximity with the lower side walls of the upper slide rail.

8. A vehicle seat slide device for a vehicle body, comprising:
    an elongated lower guide rail adapted to be secured to a floor panel of the vehicle body in a longitudinal direction thereof and including a substantially upwardly opening C-shaped channeled rail body having a pair of laterally spaced upwardly extending side walls, a pair of upper guide walls inwardly extending from upper ends of the side walls to define an elongated guide groove, slider rest portions formed at the upper ends of the side walls, first hook segments formed at inner edges of the respective upper guide walls along the elongated guide groove, and second hook segments formed on the side walls, respectively; and
    an upper slide rail adapted to be firmly fixed to a seat body and slidably fitted into the lower guide rail for slidable movement relative to the lower guide rail, said upper slide rail including a substantially downwardly opening C-channeled slide body accommodated in the lower guide rail and having a vertical wall standing upright from a center line of the slide body and extending upward through the elongated guide groove, bifurcated upper slide walls extending outwardly of a lower end of the vertical wall, downwardly extending lower side walls formed at lateral distal ends of the upper slide walls, slider rest shoulders formed on the upper slide walls and adapted to engage the first hook segments of the lower guide rail, respectively, and second engaging segments formed at lower ends of the lower side walls, respectively, and adapted to engage the second hook segments of the lower guide rail,
    wherein a pair of sliders are operatively disposed between the slider rest portions of the lower guide rail and the slider rest shoulders of the upper slide walls,
    and wherein each of the sliders has an elongated cavity extending therethrough.

9. A vehicle seat slide device for a vehicle body, comprising:
    an elongated lower guide rail adapted to be secured to a floor panel of the vehicle body in a longitudinal direction thereof and including a substantially upwardly opening C-shaped channeled rail body having a pair of laterally spaced upwardly extending side walls, a pair of upper guide walls inwardly extending from upper ends of the side walls to define an elongated guide groove, slider rest portions formed at the upper ends of the side walls, first hook segments formed at inner edges of the respective upper guide walls along the elongated guide groove, and second hook segments formed on the side walls, respectively; and an upper slide rail adapted to be firmly fixed to a seat body and slidably fitted into the lower guide rail for slidable movement relative to the lower guide rail, said upper slide rail including a substantially downwardly opening C-channeled slide body accommodated in the lower guide rail and having a vertical wall standing upright from a center line of the slide body and extending upward through the elongated guide groove, bifurcated upper slide walls extending outwardly of a lower end of the vertical wall, downwardly extending lower side walls formed at lateral distal ends of the upper slide walls, slider rest shoulders formed on the upper slide walls and adapted to engage the first hook segments of the lower guide rail, respectively, and second engaging segments formed at lower ends of the lower side walls, respectively, and adapted to engage the second hook segments of the lower guide rail, wherein a pair of sliders are operatively disposed between the slider rest portions of the lower guide rail and the slider rest shoulders of the upper slide walls, and wherein each of the sliders has an outer periphery formed with a recess extending along the slider.

10. A vehicle seat slide device for a vehicle body, comprising:

an elongated lower guide rail adapted to be secured to a floor panel of the vehicle body in a longitudinal direction thereof and including a substantially upwardly opening C-shaped channeled rail body having a pair of laterally spaced upwardly extending side walls, a pair of upper guide walls inwardly extending from upper ends of the side walls to define an elongated guide groove, slider rest portions formed at the upper ends of the side walls, first hook segments formed at inner edges of the respective upper guide walls along the elongated guide groove, and second hook segments formed on the side walls, respectively; and an upper slide rail adapted to be firmly fixed to a seat body and slidably fitted into the lower guide rail for slidable movement relative to the lower guide rail, said upper slide rail including a substantially downwardly opening C-channeled slide body accommodated in the lower guide rail and having a vertical wall standing upright from a center line of the slide body and extending upward through the elongated guide groove, bifurcated upper slide walls extending outwardly of a lower end of the vertical wall, downwardly extending lower side walls formed at lateral distal ends of the upper slide walls, slider rest shoulders formed on the upper slide walls and adapted to engage the first hook segments of the lower guide rail, respectively, and second engaging segments formed at lower ends of the lower side walls, respectively, and adapted to engage the second hook segments of the lower guide rail, wherein a pair of sliders are operatively disposed between the slider rest portions of the lower guide rail and the slider rest shoulders of the upper slide walls, and wherein each of the sliders has an outer periphery formed with an outwardly extending elongated leg.

11. A vehicle seat slide device according to claim 4, wherein the upper slide rail has at least one bottom wall integrally formed with the lower side walls.

12. A vehicle seat slide device for a vehicle body, comprising:

an elongated lower guide rail adapted to be secured to a floor panel of the vehicle body in a longitudinal direction thereof and including a substantially upwardly opening C-shaped channeled rail body having a pair of laterally spaced upwardly extending side walls, a pair of upper guide walls inwardly extending from upper ends of the side walls to define an elongated guide groove, slider rest portions formed at the upper ends of the side walls, first hook segments formed at inner edges of the respective upper guide walls along the elongated guide groove, and second hook segments formed on the side walls, respectively; and an upper slide rail adapted to be firmly fixed to a seat body and slidably fitted into the lower guide rail for slidable movement relative to the lower guide rail, said upper slide rail including a substantially downwardly opening C-channeled slide body accommodated in the lower guide rail and having a vertical wall standing upright from a center line of the slide body and extending upward through the elongated guide groove, bifurcated upper slide walls extending outwardly of a lower end of the vertical wall, downwardly extending lower side walls formed at lateral distal ends of the upper slide walls, slider rest shoulders formed on the upper slide walls and adapted to engage the first hook segments of the lower guide rail, respectively, and second engaging segments formed at lower ends of the lower side walls, respectively, and adapted to engage the second hook segments of the lower guide rail, wherein the lower guide rail includes finisher mounting segments formed at upper ends of the lower guide rail to firmly fix the lower guide rail to the floor panel of the vehicle body.

13. A vehicle seat slide device according to claim 12, further comprising a pair of finishers fixedly suppported by said finisher mounting segments and held in sliding contact with the vertical wall of the slide rail.

* * * * *

UNITED STATES PATENT AND TRADEMARK OFFICE
CERTIFICATE OF CORRECTION

PATENT NO.     : 6,520,474 B2
DATED          : February 18, 2003
INVENTOR(S)    : Yoshida et al.

It is certified that error appears in the above-identified patent and that said Letters Patent is hereby corrected as shown below:

<u>Column 13,</u>
Line 59, change "rectilinear portion" to -- rectilinear, planar portion substantially parallel to the bottom of said C-shaped channel rail body --.

Signed and Sealed this

Tenth Day of June, 2003

JAMES E. ROGAN
*Director of the United States Patent and Trademark Office*